(12) United States Patent
Zhang et al.

(10) Patent No.: US 10,728,707 B2
(45) Date of Patent: Jul. 28, 2020

(54) SYSTEM AND METHOD FOR MANAGING MOVABLE OBJECT COMMUNICATIONS

(71) Applicant: SZ DJI TECHNOLOGY CO., LTD., Shenzhen (CN)

(72) Inventors: Zhiyuan Zhang, Shenzhen (CN); Guohao Zhan, Shenzhen (CN); Chuyue Ai, Shenzhen (CN); Dhanushram Balachandran, Shenzhen (CN); Xietong Lu, Shenzhen (CN); Arnaud Thiercelin, Shenzhen (CN); Changjian Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/268,055

(22) Filed: Feb. 5, 2019

(65) Prior Publication Data
US 2019/0182623 A1   Jun. 13, 2019

Related U.S. Application Data

(63) Continuation of application No. PCT/CN2016/094327, filed on Aug. 10, 2016.

(51) Int. Cl.
| | |
|---|---|
| *H04L 29/08* | (2006.01) |
| *H04W 4/02* | (2018.01) |
| *B64C 39/02* | (2006.01) |
| *G08G 5/00* | (2006.01) |
| *H04W 4/44* | (2018.01) |

(Continued)

(52) U.S. Cl.
CPC .......... *H04W 4/027* (2013.01); *B64C 39/024* (2013.01); *G08G 5/006* (2013.01); *G08G 5/0069* (2013.01); *H04L 67/12* (2013.01); *H04L 67/2842* (2013.01); *H04M 1/72533* (2013.01); *H04W 4/029* (2018.02); *H04W 4/44* (2018.02); *H04W 12/0027* (2019.01)

(58) Field of Classification Search
CPC ...... H04W 4/027; H04W 4/029; G08G 5/006; G08G 5/0069; H04L 67/2842
USPC .......................................................... 340/4.3
See application file for complete search history.

(56) References Cited

U.S. PATENT DOCUMENTS

| | | | |
|---|---|---|---|
| 2006/0074557 A1* | 4/2006 | Mulligan | G05D 1/0094 701/13 |
| 2010/0259614 A1 | 10/2010 | Chen | |

(Continued)

FOREIGN PATENT DOCUMENTS

| | | |
|---|---|---|
| CN | 102768518 A | 11/2012 |
| CN | 105116907 A | 12/2015 |

OTHER PUBLICATIONS

The World Intellectual Property Organization (WIPO) International Search Report and Written Opinion for PCT/CN2016/094327 dated May 12, 2017 7 pages.

*Primary Examiner* — Vernal U Brown
(74) *Attorney, Agent, or Firm* — Anova Law Group, PLLC

(57) ABSTRACT

A system for managing communication with a movable object includes one or more processors configured to receive a request for movable object data from a requester in a movable object environment, determine whether movable object data corresponding to the request is available in a cache associated with a movable object manager, and, in response to determining that the movable object data is available in the cache, provide the movable object data in the cache to the requester.

19 Claims, 14 Drawing Sheets

(51) Int. Cl.
*H04W 4/029* (2018.01)
*H04W 12/00* (2009.01)
*H04M 1/725* (2006.01)

(56) References Cited

U.S. PATENT DOCUMENTS

2015/0244826 A1* 8/2015 Stenneth ................. H04Q 9/00
  709/213
2016/0306356 A1* 10/2016 Tebay .................. G05D 1/0094

* cited by examiner

*Fig. 8*

| Key pattern | Example Key String |
|---|---|
| component/key | "camera/ISO" |
| component/index/key | "camera/1/ISO" |
| component/index/subcomponent/key | "flightcontroller/1/gps/satellitesNumber" |
| component/index/subcomponent/subcomponent index/key | "flightcontroller/1/gps/2/satellitesNumber" |

SYSTEM AND METHOD FOR MANAGING MOVABLE OBJECT COMMUNICATIONS

CROSS-REFERENCE TO RELATED APPLICATION

This application is a continuation of International Application No. PCT/CN2016/094327, filed on Aug. 10, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to movable objects and more particularly, but not exclusively, to systems and methods for managing communication with a movable object.

BACKGROUND

Movable objects, such as unmanned aircraft, can be used in many different fields such as film production, sporting events, disaster relief, geological study, and more. Movable objects can be configured to transmit remote data, such as video data, back to applications that interface with the movable object. Furthermore, such applications can regularly query data, such as control or state data, from the movable object. However, communications between the movable object and the application usually take place over limited bandwidth that can result in latency, which results in asynchronous access to the movable object data by the application. This problem can be worsened by poor application design that unnecessarily increases usage of limited communication bandwidth. Presently, there lacks uniform methods and systems for providing efficient movable object communication without compromising performance.

Accordingly, there is a need for systems and methods that allow for improved communication with a movable object.

SUMMARY

In accordance with a first aspect disclosed herein, there is set forth a method of managing communication with a movable object, comprising: receiving, at a movable object manager, a request for movable object data from a requester in a movable object environment; determining whether movable object data corresponding to the request is available in a cache associated with the movable object manager; and providing the movable object data in the cache to the requester.

In accordance with another aspect disclosed herein, there is set forth a method of managing communication with a movable object, comprising: registering, via a movable object manager, a listener for listening to movable object data in a movable object environment; storing the movable object data, which is received from the movable object, in a cache associated with the movable object manager; and providing the movable object data to an application corresponding to the listener.

In accordance with another aspect disclosed herein, there is set forth a system for managing communication with a movable object, comprising: one or more processors configured for: receiving, at a movable object manager, a request for movable object data from a requester in a movable object environment; determining whether movable object data corresponding to the request is available in a cache associated with the movable object manager; and providing the movable object data in the cache to the requester.

In accordance with another aspect disclosed herein, there is set forth a system for managing communication with a movable object, comprising: one or more processors configured for: registering, via a movable object manager, a listener for listening to movable object data in a movable object environment; storing the movable object data, which is received from the movable object, in a cache associated with the movable object manager; and providing the movable object data to an application corresponding to the listener.

In accordance with another aspect disclosed herein, there is set forth a non-transitory computer-readable medium with instructions stored thereon that, when executed by a processor, perform the steps comprising: receiving, at a movable object manager, a request for movable object data from a requester in a movable object environment; determining whether movable object data corresponding to the request is available in a cache associated with the movable object manager; and providing the movable object data in the cache to the requester.

In accordance with another aspect disclosed herein, there is set forth a non-transitory computer-readable medium with instructions stored thereon that, when executed by a processor, perform the steps comprising: registering, via a movable object manager, a listener for listening to movable object data in a movable object environment; storing the movable object data, which is received from the movable object, in a cache associated with the movable object manager; and providing the movable object data to an application corresponding to the listener.

BRIEF DESCRIPTION OF THE DRAWINGS

FIG. 8 is an exemplary diagram illustrating various embodiments of a movable object data key for use in the movable object environment of FIG. 1.

Figure 1:
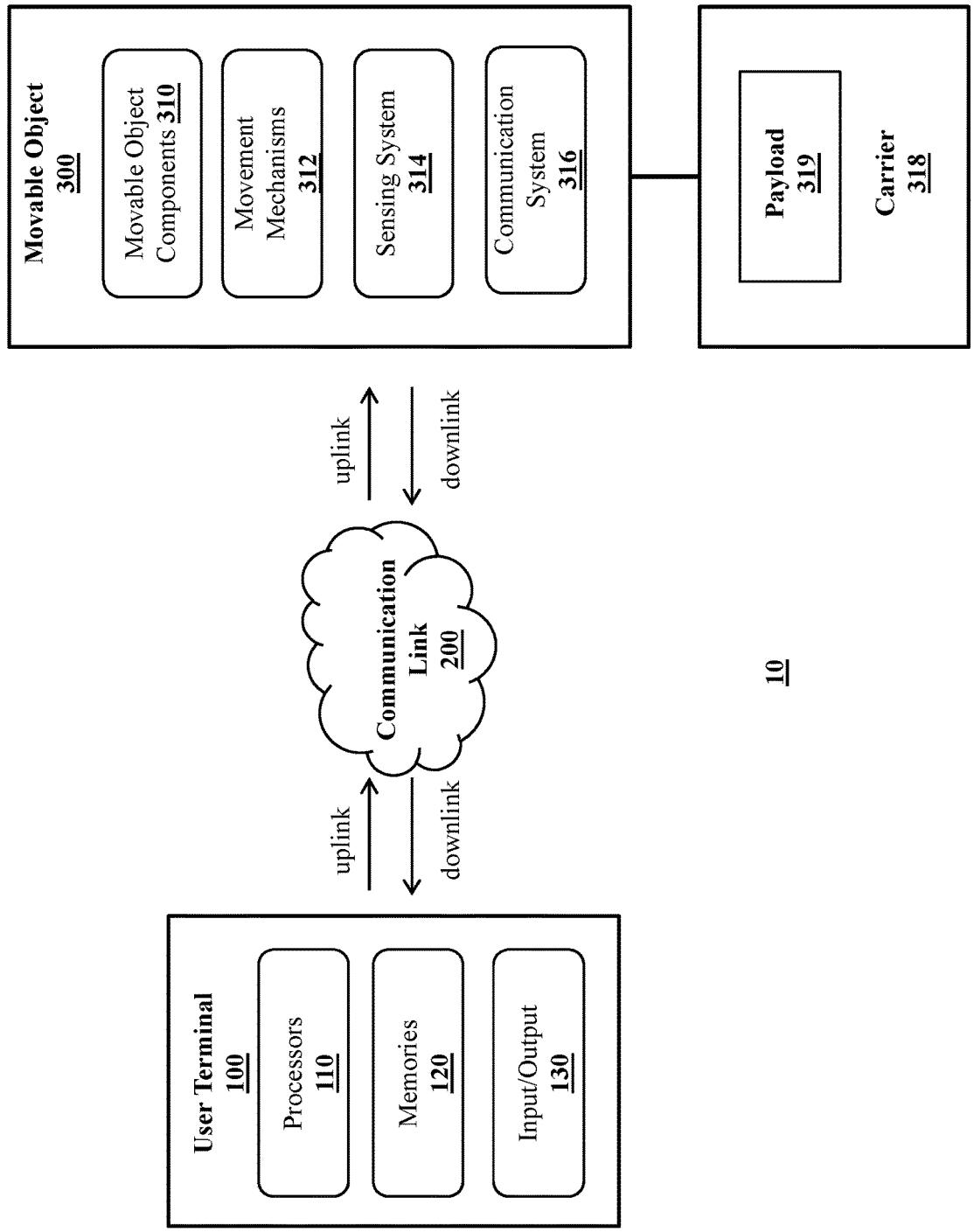
FIG. 1 is an exemplary top-level block diagram illustrating an embodiment of a movable object environment that includes a user terminal in communication with a movable object through a communication link.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

The present disclosure sets forth systems and methods for managing communication with a movable object, which overcome limitations of prior systems and methods. More particularly, the present systems and methods relate to the use of a cache for regulating access to movable object data. By using a cache, potentially redundant calls to retrieve movable object data can advantageously be reduced or eliminated. The present systems and methods can thereby regulate efficient access to remote asynchronous movable object data, thereby improving usage of limited bandwidth and improving application performance. Furthermore, the present systems and methods can utilize an application programing interface (API) that offers programmers convenient and encapsulated access to the remote asynchronous movable object data. Exemplary embodiments of the present systems and methods are described below.

Turning now to FIG. 1, an exemplary movable object environment 10 is shown in accordance with various embodiments of the present systems and methods. The movable object environment 10 can include a user terminal 100, which can communicate with a movable object 300 via a communication link 200. One or more of the user terminal 100, the communication link 200, and/or the movable object 300 can comprise a system for managing movable communications, as further described below.

The user terminal 100 can be configured to interact with a user (not shown) to operate the movable object 300 and/or present data collected by the movable object 300 to the user. The user terminal 100 can include, for example, remote controllers (not shown), portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like.

As shown in FIG. 1, the user terminal 100 (and/or components thereof) can include one or more processors 110 that can be used to execute software. The user terminal 100 can include any number of processors 110, as desired. Without limitation, each processor 110 can include one or more general purpose microprocessors (for example, single or multi-core processors), application-specific integrated circuits (ASIC), field-programmable gate arrays (FPGA), application-specific instruction-set processors, digital signal processing units, coprocessors, network processing units, audio processing units, encryption processing units, and the like. The processors 110 can be configured to perform any of the methods described herein, including but not limited to a variety of tasks relating to mobile object control, tracking, and analysis. In some embodiments, the processors 110 can include specialized software and/or hardware, for example, for processing movable object tasks using an interface. In some embodiments, the processors 110 can execute an analyzer that operates to perform any of the methods described herein.

As shown in FIG. 1, the user terminal 100 can further include one or more memories 120 (alternatively referred to herein as non-transient computer readable media). Suitable memories 120 can include, for example, random access memory (RAM), static RAM, dynamic RAM, read-only memory (ROM), programmable ROM, erasable programmable ROM, electrically erasable programmable ROM, flash memory, secure digital (SD) card, and the like. Instructions for performing any of the methods described herein can be stored in the memory 120. The memory 120 can be placed in operative communication with the processors 110, as desired, and instructions and/or data can be transmitted from the memory 120 to the processors 110 for execution, as desired.

The user terminal 100 can additionally include one or more input/output devices 130, such as buttons, a keyboard, keypad, trackball, displays, and/or a monitor. Various user interface elements (for example, windows, buttons, menus, icons, pop-ups, tabs, controls, cursors, insertion points, and the like) can be used to present data to and receive data from a user (not shown).

The user terminal 100 can be configured for communication with the movable object 300 via the communication link 200. As shown in FIG. 1, the communication link 200 can include an uplink for transmitting data (such as control data and application data) from the user terminal 100 to the movable object 300, and a downlink for transmitting data (such as telemetry data, application data, image data, and video data) from the movable object 300 to the user terminal. In some embodiments, the uplink and downlink can share a single frequency using time modulation. In other embodiments, the uplink and downlink can use different frequencies. In some embodiments, the communication link 200 can be configured to transmit signals according to a movable object protocol 250 (shown in FIG. 4).

In some embodiments, the communication link 200 can be a wireless communication link 200 over a wireless network. Suitable wireless communications can include, for example, radio, Wireless Fidelity (WiFi), cellular, satellite, and broadcasting. In certain embodiments, the communication link 200 can be implemented over a 3G, 4G, or 5G mobile telecommunications network. Exemplary wireless communication technologies that are suitable for the present systems and methods include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In some embodiments, the communication link 200 can advantageously be encrypted to prevent third party intrusion into movable object operations. Suitable encryption methods include, but are not limited to, interne key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and the like.

The movable object 300 in the present systems and methods can include any type of movable object, including bicycles, automobiles, trucks, ships, boats, trains, helicopters, aircraft, robotic devices, various hybrids thereof, and the like. Although the movable object 300 is shown in some examples herein as being a flying movable object for illustrative purposes only, such examples are not meant to be limiting. The embodiments described herein in the context of flying movable objects can be applied to any suitable movable object 300.

The movable object 300 can include or more functional modules. Each of the functional modules of the movable object 300 can include one or more movable object components 310 for carrying out, for example, movement, communication, imaging, and/or other functionality. For example, movable object components 310 can include one or more movement mechanisms 312 (for example, propulsion mechanisms), a sensing system 314, and/or a communication system 316. The movable object 300 is further shown as having a carrier 318 that includes a payload 319. The movable object 300 can further include hardware components such as processors, memories, etc., as desired. Each of the movable object components 310 can be associated with one or more attributes. The attributes and attribute values of the movable object components 310 constitute movable object data 311 (not shown) which can be generated, retrieved, stored, and used in a manner described herein.

The movement mechanisms 312 can include one or more rotors, propellers, blades, engines, motors, wheels, axles, magnets, nozzles, and the like. For example, the movable object 300 can have one or more propulsion mechanisms. In some embodiments, the movable object 300 can have multiple movement mechanisms 312 can be of the same type or different types of movement mechanisms 312. The movement mechanisms 312 can be mounted on the movable object 300 using any suitable means such as a support element (for example, a drive shaft). The movement mechanisms 312 can be mounted on any suitable portion of the movable object 300, such on the top, bottom, front, back, sides, or suitable combinations thereof. Movable object data 311 associated with the movement mechanism 312 can include, for example, data relating to positions, on/off status, and/or wear and tear status of the movement mechanism 312.

In some embodiments, the movement mechanisms 312 can enable the movable object 300 to take off vertically from a surface or land vertically on a surface without requiring horizontal movement of the movable object 300 (for example, without traveling down a runway). Optionally, the movement mechanisms 312 can be operable to enable the movable object 112 to hover at a specified position and/or orientation. One or more of the movement mechanisms 312 can be controlled independently of the other movement mechanisms 312. For example, the movable object 300 can have multiple horizontally oriented rotors that can provide lift and/or thrust to the movable object 300. The rotors can be actuated to provide vertical takeoff, vertical landing, and hovering capabilities to the movable object 300. In some embodiments, one or more of the rotors can spin in a clockwise direction, while one or more of the rotors can spin in a counterclockwise direction. For example, the number of clockwise rotors can be equal to the number of counterclockwise rotors. The rotation rate of each of the rotors can be varied independently in order to control the lift and/or thrust produced by each rotor, and thereby adjust the spatial disposition, velocity, and/or acceleration of the movable object 300 (for example, to up to three degrees of translation and up to three degrees of rotation).

The sensing system 314 can include one or more sensors that can sense the spatial disposition, velocity, and/or acceleration of the movable object 300 (for example, with respect to various degrees of translation and various degrees of rotation). The one or more sensors can include sensors such as global positioning system (GPS) sensors, motion sensors, inertial sensors (for example, inertial measurement units (IMU)), proximity sensors, image sensors, attitude and heading reference systems (AHRS), radar sensors, lidar sensors, ultrasound sensors, infrared sensors, as well as other sensors that detect motion by optics, radio, sound, vibration, magnetism, and the like. Movable object data 311 provided by the sensing system 314 can be used to control the spatial disposition, velocity, and/or orientation of the movable object 300 (for example, using a suitable processing unit and/or control module).

Alternatively, and/or additionally, the sensing system 314 can be used to collect movable object data 311 regarding an operational environment surrounding the movable object 300, such as weather conditions, proximity to potential obstacles, location of geographical features, location of manmade structures, and the like. For example, the sensing system 314 for sensing the environment can include electro-optical sensors, thermal/infrared sensors, color or monochrome sensors, multi-spectral imaging sensors, spectrophotometers, spectrometers, thermometers, illuminometers, microphones/sonic transducers, pressure sensors, altitude sensors, flow sensors, humidity sensors, precipitation sensors, wind speed sensors, wind direction sensors, anemometers, optical rain sensors, positioning devices, accelerometers, gyroscopes, and/or others.

The communication system 316 can enable communication with the user terminal 100 via the communication link 200, which can include various wired and/or wireless technologies as discussed above. The communication system 316 can include any number of transmitters, receivers, and/or transceivers suitable for wireless communication. The communication can be one-way communication whereby the movable object 300 transmits movable object data 311 to the user terminal 100, or vice-versa. The communication can also be two-way communication, whereby movable object data 311 can be transmitted in both directions between the movable object 300 and the user terminal 100.

In some embodiments, the user terminal 100 can provide movable object data 311 that is control data to one or more of the movable object 300, carrier 318, and payload 319 and receive information from one or more of the movable object 300, carrier 318, and payload 319 (for example, position and/or motion information of the movable object, carrier or payload; data sensed by the payload such as image data captured by a payload camera; and data generated from image data captured by the payload camera). In some embodiments, control data from the user terminal 100 can include instructions for relative positions, movements, actuations, or controls of the movable object, carrier, and/or payload. For example, the control data can result in a modification of the location and/or orientation of the movable object (for example, via control of the movement mechanisms 312), or a movement of the payload with respect to the movable object (for example, via control of the carrier 318). The control data from the application can result in control of the payload. Any payload 319 can be used with the present systems and methods.

In some embodiments, communications from the movable object 300, carrier 318 and/or payload 319 can include information from one or more sensors (for example, of the sensing system 314 or of the payload 319) and/or data generated based on the sensing information. The communications may include sensed information from one or more different types of sensors, as described above. Such information may pertain to the position (for example, location or orientation), movement, or acceleration of the movable object, carrier, and/or payload. Movable object data 311 from the payload 319 can include data captured by the payload 319 or a sensed state of the payload 319.

Figure 2:
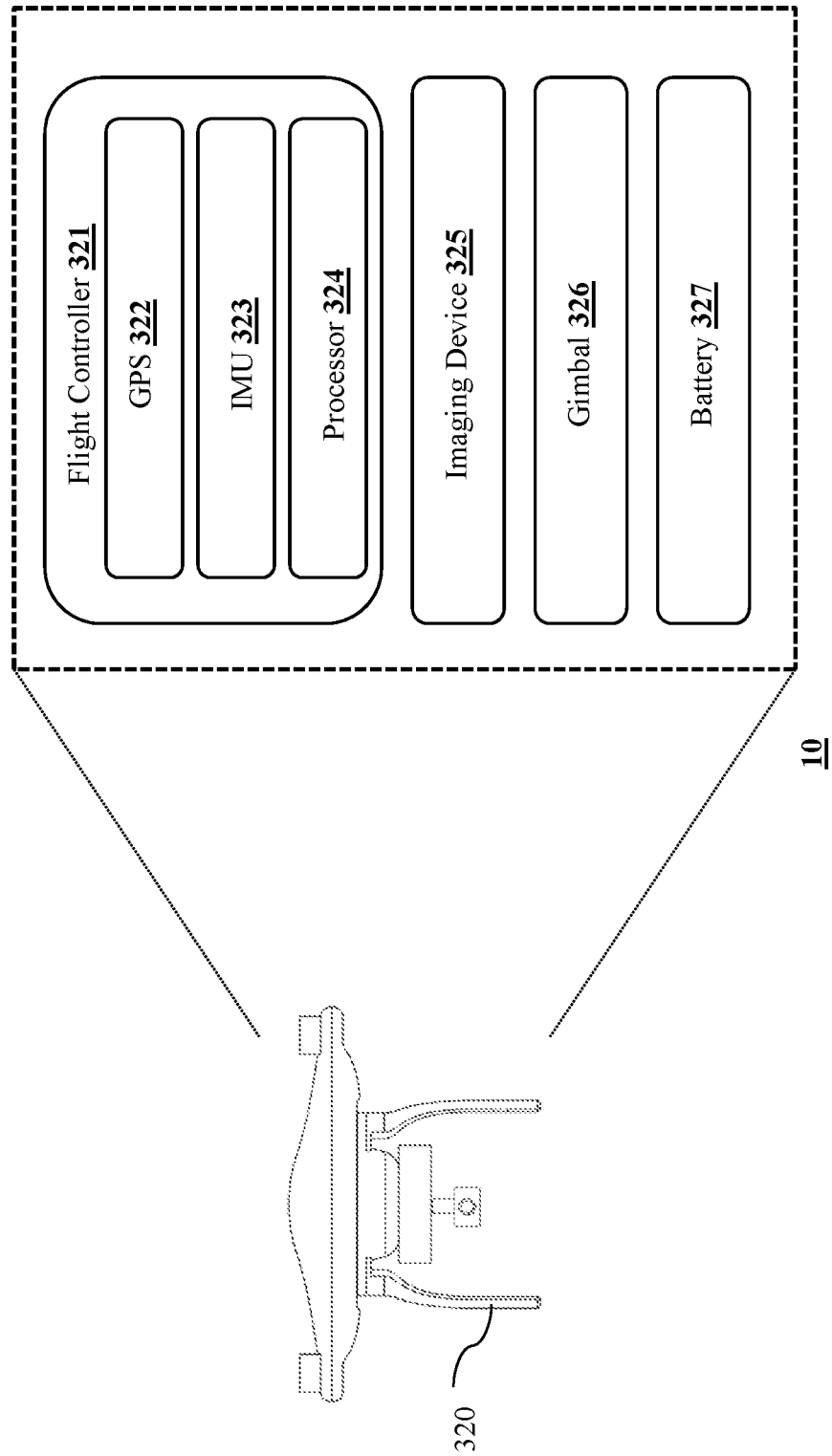
FIG. 2 is an exemplary diagram illustrating an embodiment of the movable object of FIG. 1, wherein the movable object is a UAV.

Turning now to FIG. 2, an exemplary movable object 300 is shown in a movable object environment 10 as an unmanned aerial vehicle (UAV) 320. Colloquially referred to as "drones," UAVs 320 include aircraft without a human pilot onboard the vehicle whose flight is controlled autonomously or by a remote pilot (or sometimes both). UAVs 320 are now finding increased usage in civilian applications involving various aerial operations, such as data-gathering or delivery. The present movable object operation systems and methods are suitable for use with many types of UAVs 320 including, without limitation, quadcopters (also referred to a quadrotor helicopters or quad rotors), single rotor, dual rotor, trirotor, hexarotor, and octorotor rotorcraft UAVs 320, fixed wing UAVs 320, and hybrid rotorcraft-fixed wing UAVs 320.

Movable object components 310 of a UAV 320 can include, for example, a flight controller 321 for controlling flight operations of the UAV 320. The flight controller 321 can include one or more sensing systems 314 (described above with reference to FIG. 1), such as one or more GPS 322 and/or IMU 323. The flight controller 321 can be operated using a processor 324 embedded within the flight controller 321. The flight controller 321 can, for example, control a movement of the UAV 320. Exemplary control of the movement include setting target destination, velocity, altitude, attitude (pitch, roll, and yaw), and/or the like. The flight controller 321 can communicate with selected data collection instruments (not shown) of the UAV 320 to obtain movable object data 311.

The UAV 320 can also include an imaging device 325. The imaging device 325 can receive incident light from an external environment and convert the incident light into digital and/or analog signals (not shown). The signals can be processed to produce an image that can be displayed to a user. Exemplary imaging devices 325 suitable for use with the present systems and methods include, but are not limited to, commercially-available cameras and camcorders. In some embodiments, the imaging device 325 can be adapted to use additional sensors (not shown) for various applications such as stereo vision, thermography, creation of multispectral images, infrared detection, gamma detection, x-ray detection, and the like.

The imaging device 325 can be controlled in various ways, such as turn the imaging device 325 on and off, and get or set parameters of the imaging device 325 (for example, imaging angle, imaging mode, photo/video size/resolution, photo/video format, zoom settings, exposure settings, and the like). For example, movable object data 311 collected can include various parameters of the imaging device 325, still image data, and/or video image data from the imaging device. Exemplary still image data and video image data can respectively include still images and video images captured aerially by the imaging device 325.

The UAV 320 can further include a gimbal 326 for precise rotational and/or translational positioning of mounted objects, such as an imaging device. The gimbal 326 can include one or more pivoted supports (not shown) that are mounted with respect to one or more axes of rotation, thereby allowing a mounted object to be rotationally independent with respect to a fixture to which the gimbal 326 is mounted. The manner of configuring and mounting the pivoted supports can vary and can include, for example, concentric ring structures and non-ring structures. Depending on the number of degrees of freedom desired, the gimbal 326 can include any suitable number, including one, two, or three, pivoted supports. The gimbal 326 can include various mechanical apparatus as needed, such as ball bearings, tracks, actuators, and the like. The gimbal 326 can be configured to respond to external commands (for example, from a processor) directing movement of the imaging device 325. Movable object data 311 (such as angles and positions) of the gimbal 326 can be retrieved, as desired.

The UAV 320 can further include one or more batteries 327 for providing power to the UAV 320 and/or any functional modules of the UAV 320. Each battery 327 can include any number of battery cells each having two electrodes (not shown) and an electrolyte (not shown) that reacts chemically to generate an electric potential, providing electric current between the electrodes. The battery 327 can be chargeable and/or rechargeable. The battery 327 can include any type of battery cells, including, but not limited to, lead-acid cells, lithium air cells, lithium-ion cells, nickel-cadmium cells, nickel-metal hydride hydrogen cells, and the like. In some embodiments, the battery 327 be a smart battery whose internal state and charging/discharging are monitored by a battery manager (not shown). Movable object data 311 (such as remaining charge) of the battery 327 can advantageously be retrieved and monitored, as desired, for operation of the movable object 300.

Figure 3:
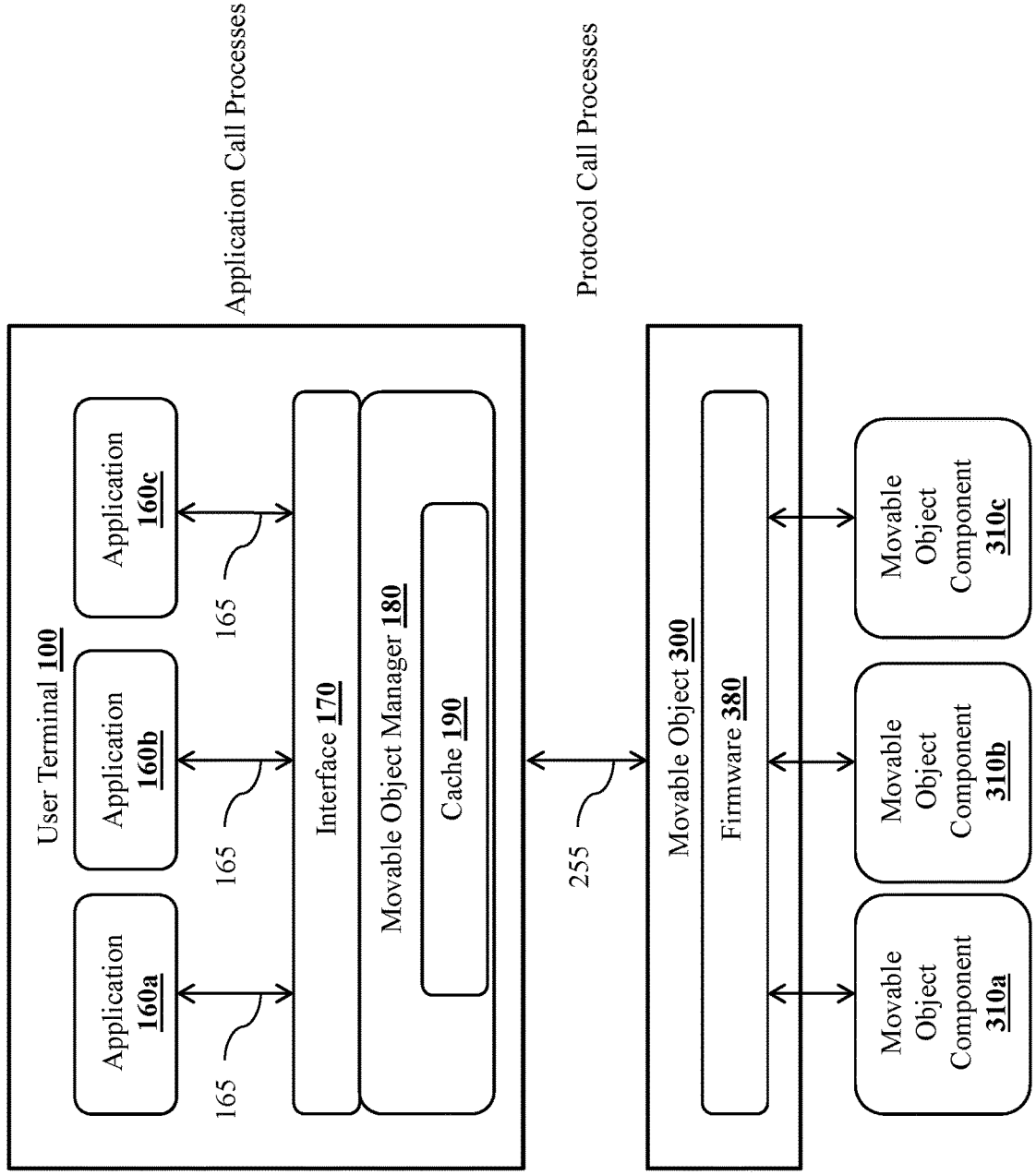
FIG. 3 is an exemplary block diagram illustrating an embodiment of an environment of the movable object operation system of FIG. 1.

Turning now to FIG. 3, an exemplary movable object environment 10 is shown as including a user terminal 100, as well as a movable object 300. The movable object environment 10 can, for example, be a movable object software environment. The movable object environment 10 can be configured using any convenient programming language, such as Java, C, C++, Python, and the like. The movable object environment 10 can be operated using any appropriate hardware, as described above with reference to FIG. 1.

As shown in FIG. 3, the user terminal 100 can include one or more applications 160a, 160b, and 160c that are installed on the user terminal 100. Where the user terminal 100 is a mobile device, the application 160 can be colloquially referred to as an "app." The app can be made available by a vendor and kept updated by the vendor through, for example, a mobile app store.

In some embodiments, the applications 160a, 160b, and 160c can be individually or collectively configured to invoke an interface 170. For example, the interface 170 can be an application programming interface (API) that includes one or more defined elements such as functions, methods, procedures, parameters, constants, variables, objects, modules, datatypes, exceptions, etc. The API can be a movable object API that includes elements for interacting with and controlling a movable object 300. A software developer can, for example, program an application 160 using the API. When being implemented on the user terminal 100, the application 160 can invoke the API and execute functionality specified by the API.

The applications 160a, 160b, and 160c can interact with elements of the interface 170 through application call processes 165, as shown in FIG. 3. For example, an application call process 165 can be a get( ) method call that is made by an application 160 to the interface 170 to retrieve a value of particular movable object data 311. As another example, the application call process 165 can be a set( ) method call to set a value for particular movable object data 311. Another exemplary application call process 165 is a method call to the interface 170 that commands the movable object 300 to perform one or more tasks for the movable object 300.

In some embodiments, the interface 170 can be part of a movable object software development kit (SDK). The movable object SDK can advantageously provide common, integrated functionality for applications 160 that interact with movable objects 300. For example, applications 160 that are designed to control a flying movable object 300 can invoke functions in the movable object SDK for controlling navigation of the flying movable object 300. Applications 160 relating to imaging from a movable object 300 can invoke functions in the movable object SDK for controlling an imaging device 325 (shown in FIG. 2) or gimbal 326 (shown in FIG. 2) of the movable object 300. The movable object SDK can further include tools, libraries, documentation and sample code that can help a software developer to use the SDK for developing a movable object application.

In some embodiments, the movable object 300 can be managed using a movable object manager 180. The movable object manager 180 can be located anywhere that is convenient. Though the movable object manager 180 is depicted as being a part of the user terminal 100 in FIG. 3 for illustrative purposes only, the movable object manager 180 is not limited in locality or implementation. In some embodiments, the movable object manager 180 can be part of the movable object 300, or be any part of a movable object environment 10. The movable object manager 180 can be configured with logic for determining when communication with the movable object 300 is necessary, and when such communication is unnecessary.

The movable object manager 180 can be configured to manage the movable object 300 by, for example, receiving data, sending commands, and/or processing data in relation to the movable object 300. In some embodiments, the movable object manager 180 can be configured to manage the movable object 300 by handling application call processes 165 received through the interface 170. The movable object manager 180 can convert the received application call processes 165 into protocol call processes 255 to the movable object 300. Additionally, the movable object manager 180 can issue protocol call processes 255 to the movable object 300 that are not triggered through the interface 170. For example, the movable object manager 180 can perform background tasks that relate to maintaining movable object performance (such as maintaining altitude, pitch, or heading of a flying movable object 300, checking that the movable object 300 has sufficient fuel remaining, or automatically directing the movable object to avoid restricted zones such as airports). In some embodiments, the movable object manager 180 can be configured to communicate with an authentication server (not shown) for providing a secure environment for communication between the user terminal 100 and the movable object 300.

The movable object manager 180 can include various modules, such as a communication module or data management module (not shown), as needed. As illustrated in FIG. 3, the movable object manager 180 includes a cache 190 for managing communications with the movable object 300. In particular, the cache 190 can store values of certain movable object data 311 of interest. The movable object data 311 can be retrieved asynchronously by an application 160. In some embodiments, an application that desires access to the movable object data 311 can register a listener 191 (shown in FIG. 6) that corresponds the movable object data. The listener 191 can facilitate updating and retrieving the movable object data 311, as desired.

In some embodiments, communication between the user terminal 100 and the movable object 300 can be conducted using protocol call processes 255 that are transmitted back and forth between the user terminal 100 and the movable object 300. The protocol call processes 255 can be transmitted according to a movable object protocol 250 (shown in FIG. 4). The protocol call processes 255 can include structured data that encodes signals for the movable object 300 to take specific actions, or signals from the movable object 300 indicating present status.

The protocol call processes 255 can advantageously be encrypted to avoid third-party intrusion and unwanted interference with movable object operations. In such cases, the protocol call processes 255 can be configured to be decrypted only by verified or trusted users. In some embodiments, the protocol call processes 255 can be formatted according to a proprietary format that is decipherable only by a designer or manufacturer of the movable object 300. Consequently, the protocol call processes 255 can be made opaque to users, and decipherable only by the designer or manufacturer for troubleshooting purposes.

As shown in FIG. 3, signals received by the movable object 300 can be processed by firmware 380 within the movable object 300. The firmware 380 can reside, for example in a read-only memory of the movable object 300. The firmware 380 can be configured to decode protocol call processes 255 received from the user terminal 100, and send corresponding signals to the movable object components 310a, 310b, and 310c of the movable object 300. Accordingly, the protocol call processes 255 can be translated directly into physical action by the movable object components 310.

Figure 4:
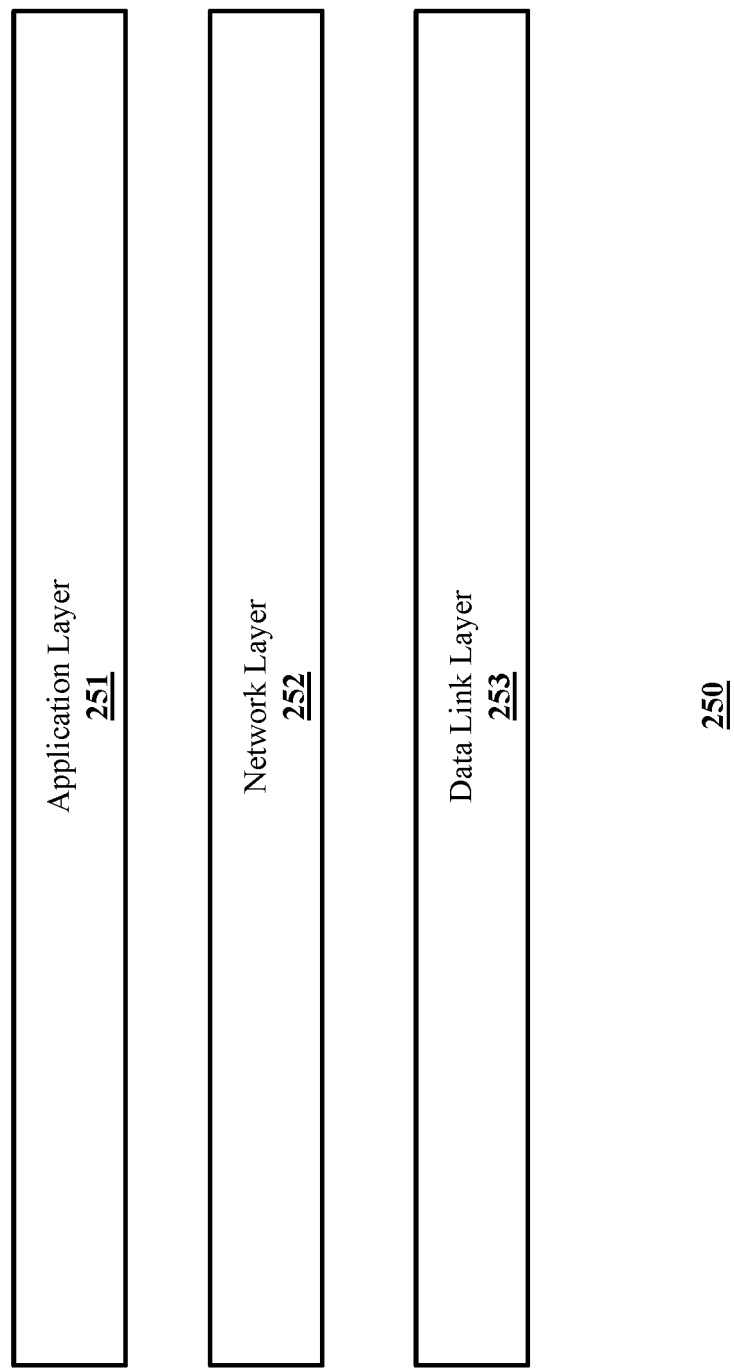
FIG. 4 is an exemplary diagram illustrating an embodiment of a communication protocol for use in the movable object environment of FIG. 1.

Turning now to FIG. 4, an exemplary movable object protocol 250 for the communication link 200 (shown in FIG. 1) is shown in accordance with various embodiments of the present systems and methods. The movable object protocol 250 can include an application layer 251, a network layer 252, and a data link layer 253. The application layer 251 can be used, for example, for handling application logic, such as controlling behavior of functional modules 310 of a movable object 300 (shown in FIG. 1). The network layer 252 can be used, for example, for supporting data packet routing and relaying. The data link layer 253 can be used, for example, for handling data framing, data verification, and data retransmission.

In some embodiments, the movable object protocol 250 can support communication between various modules of a UAV 320, such as a flight control module, gimbal module, camera module and/or other modules. The movable object protocol 250 can be used with different communication link technologies, such as a universal asynchronous receiver/transmitter (UART) technology, a controller area network (CAN) technology, and an inter-integrated circuit (I2C) technology.

Figure 5:
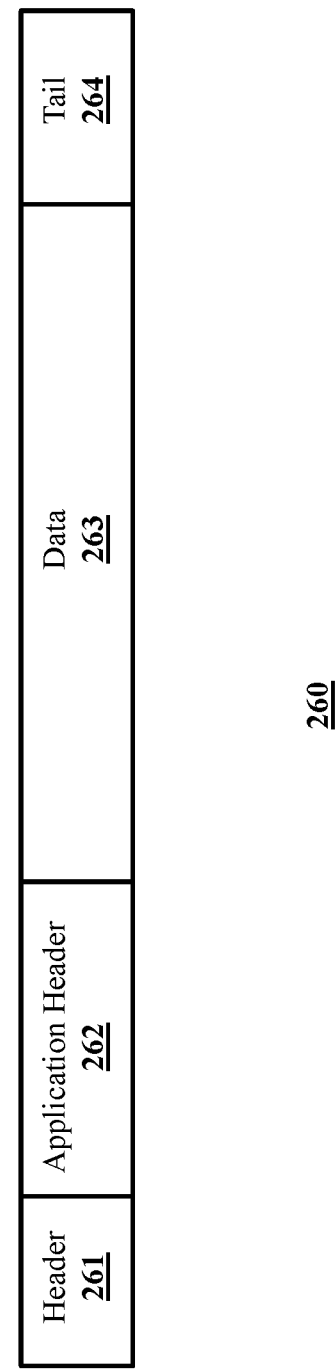
FIG. 5 is an exemplary diagram illustrating an embodiment of a data packet for use in the movable object environment of FIG. 1.

Communications can be made using the movable object protocol 250 through transmission of packets 260 through the communication link 200. An exemplary packet 260 is shown in FIG. 5. The packet 260 can include a header 261, an application header 262, data 263, and a tail 264. The header 261 and tail 264 can include, for example, control information that a network needs for delivering the data 263. For example, the control information can include source and destination network addresses, error detection codes, and packet sequencing information. The application header 262 can include, for example, various sender and receiver information. For example, the sender and receiver can be among different functional modules 310 on the movable object 300 and applications 160 on the user terminal 100 (shown in FIG. 1).

Figure 6:
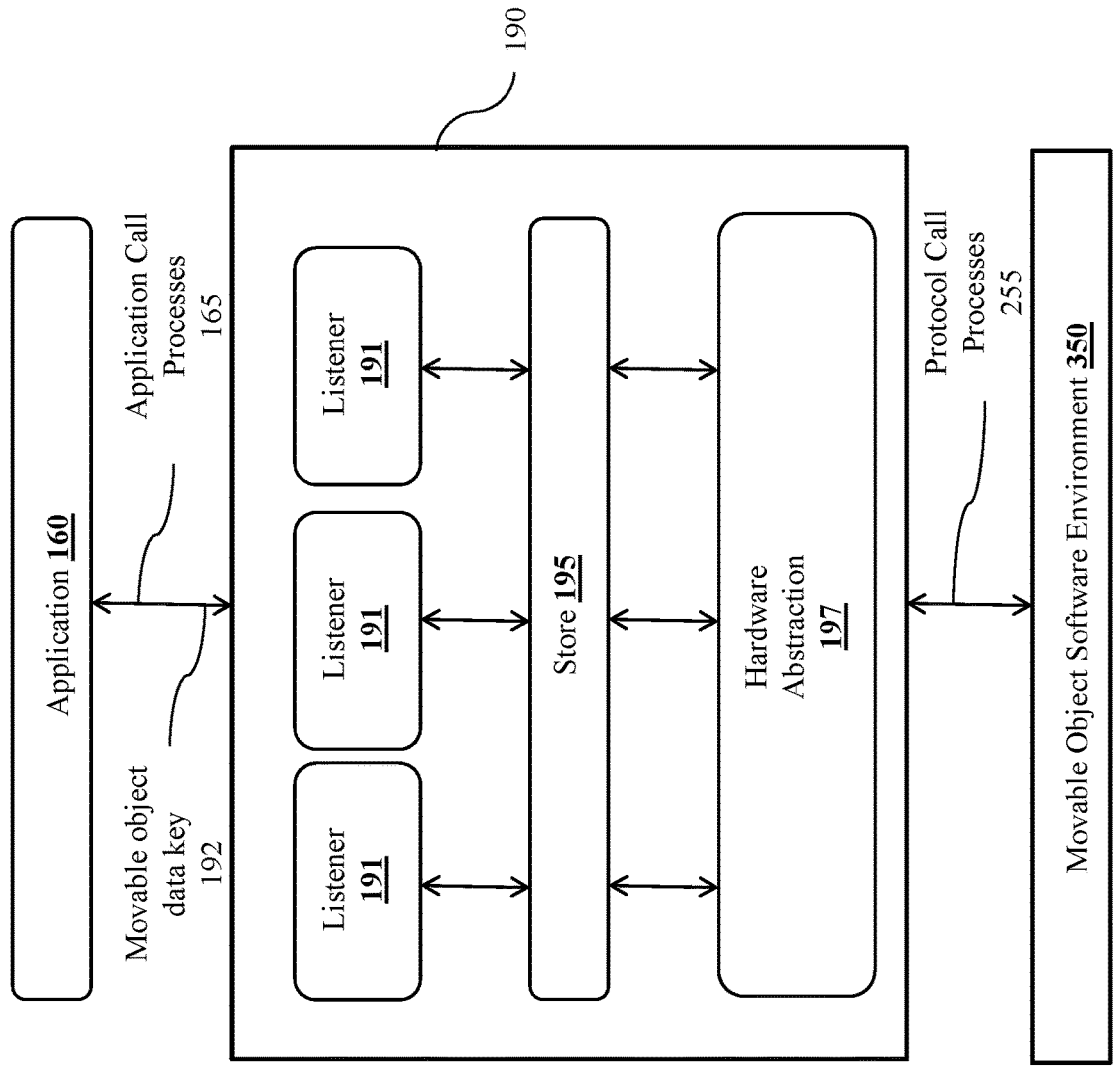
FIG. 6 is an exemplary block diagram illustrating an embodiment of a cache for use in the movable object environment of FIG. 1.

Turning now to FIG. 6, an exemplary cache 190 is shown in a movable object environment 10 that advantageously allows access to data, such as asynchronous remote data, from a movable object 300. The cache can be a part of or otherwise associated with a movable object manager 180, as shown above with reference to FIG. 3. The exemplary cache 190 is shown as including listeners 191, a store 195, and a hardware abstraction 197. The present multi-layered configuration of the cache 190 advantageously separates states of the movable object data 311 from logic, thereby increasing the ease of implementation and testing.

Generally, any number of listeners 191, stores 195, and hardware abstractions 197 can be created, used, and/or destroyed within the cache 190, as appropriate. In some embodiments, multiple applications 160 can access the cache 190 at the same time. In some embodiments, access to the cache 190 can be limited to a single application 160. Although a single hardware abstraction 197 is shown in FIG. 6 for illustrative purposes only, any number of hardware abstractions 197 can be used, as desired. The cache 190 can be implemented, for example, by allocating one or more blocks of memory in the memories 130 (shown in FIG. 1) for storing movable object data 311. The blocks of memory can be de-allocated when the cache 190 no longer needs the blocks.

The one or more listeners 191 can be registered for listening to and/or providing access to particular movable object data 311. In some embodiments, a listener 191 can be registered by an application 160 that desires access to the particular movable object data 311. For example, the application 160 can invoke an addListener( ) method in a movable object API to create, or instantiate, a listener 191 in the movable object environment 10. The addListener( ) method can include a movable object data key 192 that identifies the movable object data 311 of interest to the listener 191. The movable object data key 192 can be represented, for example, as a parameter to the addListener( ) method—for example, as a string having a defined format, or as any other suitable type or class. The movable object data key 192 can include different data fields (shown in FIG. 8) that identify a particular movable object component 310 as well as a particular attribute of the movable object component 310.

The cache 190 can further include a store 195 in the movable object environment 10 for storing values of movable object data 311. In some embodiments, the store 195 can be a software representation of underlying blocks of memory for storing the values of the movable object data 311. The memory can be allocated and de-allocated, as needed. The store 195 can be represented using any suitable data structure, such as an array, a list, a hash table, a tree, a queue, and the like. In some embodiments, a separate store 195 can be created for each movable object component 310. In such cases, each value of the movable object data 311 can be referenced according to a corresponding attribute. In other embodiments, a single store 195 can include movable object data 311 for multiple movable object components 310. In such cases, the movable object data 311 can be referenced according to an identifier (for example, a string) corresponding to the movable object component 310, as well as an identifier (for example, a string) corresponding to the attribute of the movable object component. In some embodiments, a single store 195 can be created in the movable object environment 10 for all movable object data 311 (as shown in FIG. 6).

In some embodiments, the movable object data 311 can be represented as a constant, read-only, or immutable value in the store 195. When the cache 190 receives a new or updated value of the movable object data 311, a prior read-only representation of the movable object data 311 can be deleted from the store 195, and a new read-only representation of the movable object data 311 can be created and placed in the store 195. In some embodiments, a new movable object data key 192 can be created and associated with the new representation of the movable object data 311. The representation of the movable object data 311 as a constant ensures consistency of the movable object data 311 among multiple threads, thereby improving thread safety and improving application performance. The use of immutable representations of the movable object data 311 to handle thread-shared data advantageously avoids the thread locks and can improve performance. Alternatively, and/or additionally, movable object data 311 can be represented in the cache 190 as a mutable or variable value. In some embodiments, mechanisms such as thread locks can be used to avoid data corruption between multiple threads.

As shown in FIG. 6, the cache 190 can further include one or more hardware abstractions 197 in the movable object environment 10. Each of the hardware abstractions 197 can correspond to particular movable object component 310. In some embodiments, each of the hardware abstractions 197 can be a software object for interacting with corresponding movable object components 310. For example, a FlightController object can be instantiated in the movable object environment 10 that corresponds to a flight controller 321

(shown in FIG. 2). Similarly, a Camera object can be instantiated in the movable object environment 10 that corresponds to an imaging device 325 (shown in FIG. 2). Likewise, a Battery object can be instantiated in the movable object environment 10 that corresponds to a battery 327 of a UAV 320 (shown in FIG. 2), and so forth.

In some embodiments, the hardware abstractions 197 can be organized using inheritance. For example, a base Camera class can be defined as having attributes that are common to a variety of imaging devices 325, for example, an ISO setting. The Camera base class can include, for example, getISO( ) and set ISO( ) methods, as desired. A subclass HighPerformanceCamera can be defined as inheriting from the Camera base class, and include accessors specific to a high performance imaging device 325, as appropriate.

In some embodiments, one or more of the hardware abstractions 197 can be configured to correspond to movable object components 310 having one or more subcomponents. For example, a hardware abstraction can be instantiated to correspond to a flight controller 321 having a GPS 322 and/or an IMU 323. Movable object data 311 of the subcomponents can be accessed using a movable object data key 192, as described above.

In some embodiments, a hardware abstraction 197 can be created for communication with or access to a specific corresponding movable object component 310. For example, an application 160 can create a hardware abstraction 197 using a suitable application call process 165. In some embodiments, a hardware abstraction 197 can be removed or destroyed when communication with or access to the specific corresponding movable object component 310 is no longer desired. During runtime, the number of hardware abstractions 197 that are instantiated at any one time can advantageously be kept low so as to reduce memory usage and improve efficiency. In some embodiments, the number of hardware abstractions 197 can be kept below a predetermined threshold (for example, a maximum of 20 hardware abstractions 197).

Figure 7:
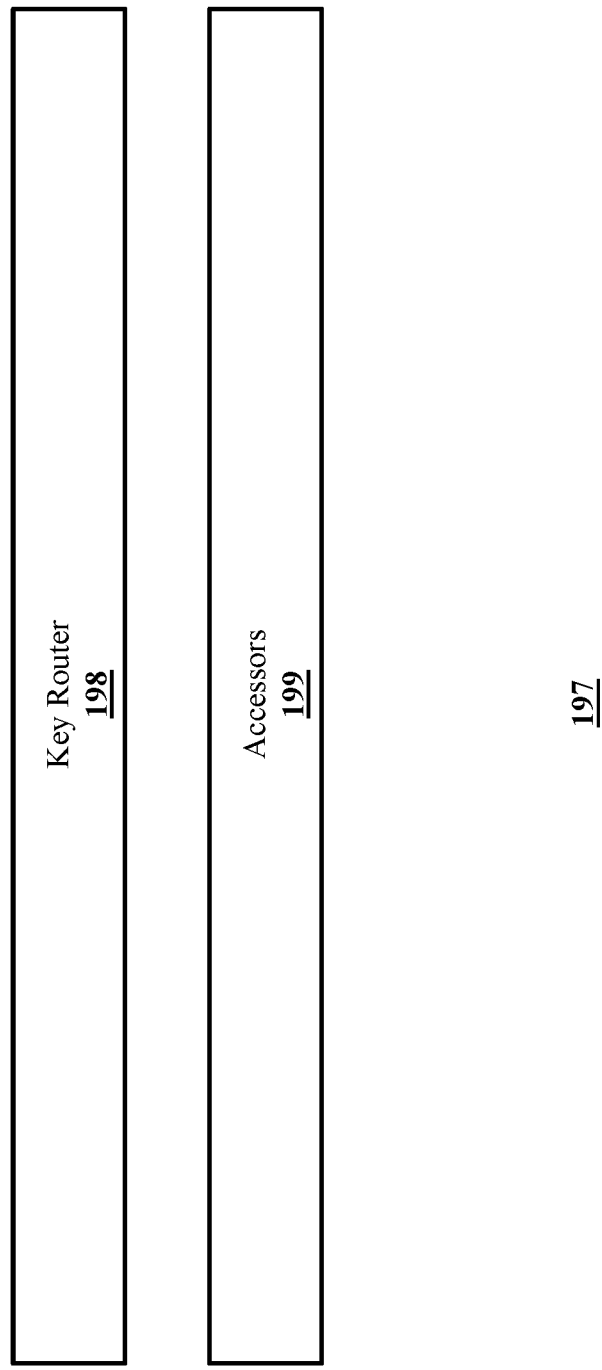
FIG. 7 is an exemplary block diagram illustrating an embodiment of a hardware abstraction in the cache of FIG. 6.

Turning now to FIG. 7, an exemplary hardware abstraction 197 is shown as having a key router 198 and one or more accessors 199. The key router 198 can include a dictionary of movable object data keys 192, as well values of the movable object data 311 associated with each of the movable object data keys 192. A dictionary for the key router 198 can be represented using any suitable data structure, such as an array, a list, a hash table, a tree, a queue, and the like. The key router 198 can thereby define the available movable object data keys 192 representing various attributes of the movable object component 310. Furthermore, the key router 198 can define various characteristics of each attribute, such as which type of access (for example, read access, write access, or any combination thereof) is available for each of the attributes. Such characteristics can, for example, be associated with the movable object data key 192 corresponding to each attribute of the movable object component 310. The accessors 199 of the hardware abstraction 197 can include, for example, a get( ) method to retrieve the value of a particular attribute, or a set( ) method to set a value of a particular attribute. The specific details of the accessors 199 can be implemented by a developer, as appropriate. In some embodiments, the key router 198 can be implemented as an immutable dictionary, such that the attributes of the movable object components 310 are unchanged.

Turning now to FIG. 8, exemplary movable object data keys 192 are shown in a string format, wherein each string takes on a predetermined key pattern. Shown on the left side of FIG. 8 are exemplary key patterns, which can be as "component/key," "component/index/key," "component/index/subcomponent/key," or "component/index/subcomponent/subcomponent index/key." Here, "component" can represent a movable object component 310 (for example, "camera" to represent an imaging device 325) to be accessed using the movable object data key 192. "Index" can represent a numeric value corresponding to a particular movable object component 310 of a specific type (for example, "camera/1" to represent the first of two imaging devices 325). "Subcomponent" can represent a subcomponent of the movable object component 310 (for example, a GPS 322 of a flight controller 321). "Subcomponent index" can represent a numeric value of corresponding to a particular subcomponent of the movable object component 310 (for example, "gps/1" to refer to the first of two GPS 322 devices of a flight controller 321). "Key" can represent a particular attribute, parameter, or other data associated with the movable object component 310 or subcomponent. For example, a movable object data key 192 for a satellites number attribute for a second GPS 322 device of a first flight controller 321 can be represented as the string "flightcontroller/1/gps/2/satellitesNumber," as shown in FIG. 8.

In some embodiments, string representation of a movable object data key 192 can be converted by the cache 190 into any other data type for internal use and communication within the cache 190. For example, the cache 190 can use a KeyPath object that includes methods for parsing the string representation of the movable object data key 192, as well as includes attributes for each portion string. Using a KeyPath or like object advantageously avoids re-parsing the string representation of the movable object data key 192.

Figure 9:
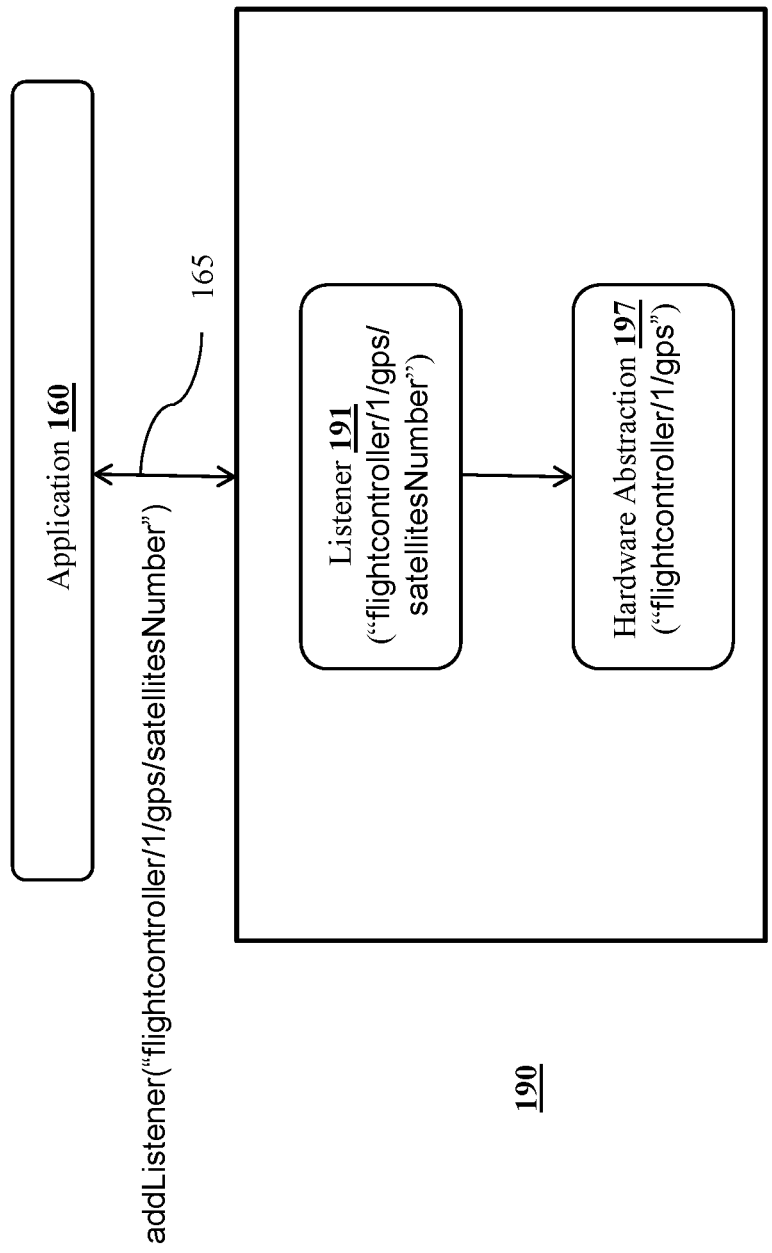
FIG. 9 is an exemplary diagram illustrating an embodiment of a method for adding a new listener corresponding to movable object data of interest.

Turning now to FIG. 9, an exemplary process for registering a listener 191 is shown in accordance with the examples provided above. Here, an application 160 is interested in values of a "satellites number" attribute of a GPS 322 device of a flight controller 321 of a UAV 320 (not shown). In particular, the application 160 has a need to be notified of changes in value of the satellites number field. To do so, the application 160 can access a movable object interface 180 having an addListener( ) method for registering a listener 191. In particular, the application 160 can invoke the addListener( ) method in an application call process 165 that specifies a movable object data key 192 (for example, a string key "flightcontroller/1/gps/satellitesNumber") as a parameter.

Upon invoking the addListener( ) method, a new listener 191 is created corresponding to the movable object data key 192 "flightcontroller/1/gps/satellitesNumber." Thereafter, the listener 191 that is created can be registered with the appropriate movable object component 310 (here, the flight controller 321 and/or the GPS 322 subcomponent). The listener 191 can be associated with a hardware abstraction 197 that corresponds to the movable object component 310. When a value of the attribute corresponding to the listen 191 is changed, the listener 191 can be used to notify the application 160 of the change and/or the new value via the appropriate movable object data 311.

Figure 10:
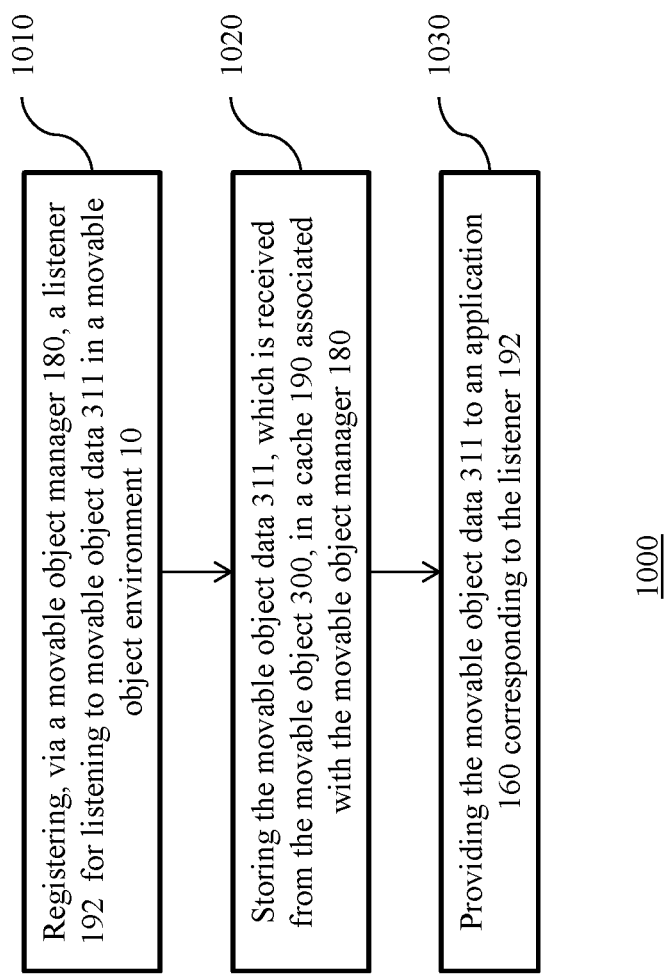
FIG. 10 is an exemplary top-level flow chart illustrating an embodiment of a method for managing communication with the movable object of FIG. 1.

Turning now to FIG. 10, an exemplary method 1000 for managing communication with a movable object 300 is shown. At 1010, a listener 191 is registered, via a movable object manager 180, for listening to movable object data 311 in a movable object environment 10. In some embodiments, the listener 191 can be registered in a movable object software environment 50 (shown in FIG. 3). For example, the listener 191 can be registered through a movable object application programming interface (API), as described above with reference to FIG. 3. The movable object API can include, for example, one or more functions, methods, procedures, parameters, constants, variables, objects, modules, datatypes, exceptions, etc. that a an application 160 can utilize to interact with and control the movable object 300. In some embodiments, the listener 191 can be registered through a movable object API that is part of a movable object software development kit (SDK). The movable object SDK can include tools, libraries, documentation and sample code that can help a software developer use the SDK for developing a movable object application 160.

In some embodiments, the listener 191 can be registered with a movable object component 310 corresponding to the specific movable object data 311. For example, as described above with respect to FIG. 9, a listener 191 for a GPS 322 device of a flight controller 321 can be registered with the flight controller 321 and/or the GPS 322.

In some embodiments, the listener 191 can be registered with a hardware abstraction 197 corresponding to the movable object component 310. For example, as described above with respect to FIG. 9, a hardware abstraction 197 for the flight controller 321 and/or the GPS 322 can be instantiated during runtime of the application 160. The hardware abstraction 197 can have a key router 198 that is initialized with relevant attributes of the movable object component 310 and/or various subcomponents thereof. The listener 191 can be registered using an appropriate movable object data key 192 that identifies the movable object component 310. For example, the movable object data key 192 can be a string having a substring that identifies the movable object component 310 (for example, "flightcontroller" to identify the flight controller 321). The movable object data key 192 can further identify an attribute of the movable object component 310 or subcomponent thereof (for example, "satellitesNumber" to identify a satellites number attribute of the GPS 322).

In some embodiments, the listener 191 can be de-registered when movable object data 191 from the movable object component 310 is no longer desired. For example, the application 160 can be configured to signal to the movable object manager 180 that the application 160 is no longer interacting with the movable object 300. In some embodiments, the application 160 can send a stop signal to the movable object manager 180. In some embodiments, the movable object manager 180 loses connection with the application 160, whereupon the listener 191 can be automatically de-registered.

At 1020, movable object data 311 which is received from the movable object 300 can be stored in a cache 190 associated with the movable object manager 180. The movable object data 311 can be received using the listener 191 via a request for the movable object data 311 that uses the movable object data key 192. In some embodiments, the listener 191 can determine whether the movable object data 311 is available in the cache 190, and/or whether the movable object data 311 is updated in the cache 190. Upon determining that the movable object data 311 is not available or not updated in the cache 190, the movable object 300 can be queried for an updated value of the movable object data 311. For example, the application 160 can query the movable object 300 for the updated value of the movable object data 311. The movable object 300 can be queried for the value of the movable object data 311 using a request, such as a get( ) method in the movable object interface 170. In some embodiments, the cache 190 can be configured to automatically query the movable object 300 for the updated value of the movable object data 311 upon determining that the movable object data 311 is not available or not updated. The request can be performed via the hardware abstraction 197 that corresponds with the movable object component 310 having the desired movable object data 311. For example, the request can be performed using a protocol call process 255 that is transmitted to the movable object 300 using the hardware abstraction 197. After the querying, an updated value of the movable object data 311 can be received from the movable object (for example, using a protocol call process 255 transmitted from the movable object 300).

At 1030, movable object data 311 that is received at 1020 can be provided to an application 160 corresponding to the listener 191. In some embodiments, the application 160 can be an application 160 for interacting with and/or controlling the movable object 300. In some embodiments, the listener 191 can be used to detect a change in a value of the movable object data 311. The change can be detected, for example, by storing a prior value of the movable object data 311 in the cache 190. The listener 191 can periodically receive an updated value of the movable object data 311 and compare the prior value to the updated value to detect a change in the value. Upon detecting the change in value, the listener can notify the application 160 of the change in the movable object data 311. Furthermore, the changed value of the movable object data 311 can be automatically provided to the application 160. In some embodiments, the movable object data 311 is not automatically provided to the application 160, and the application can optionally request the movable object data 311, if desired.

Figure 11:
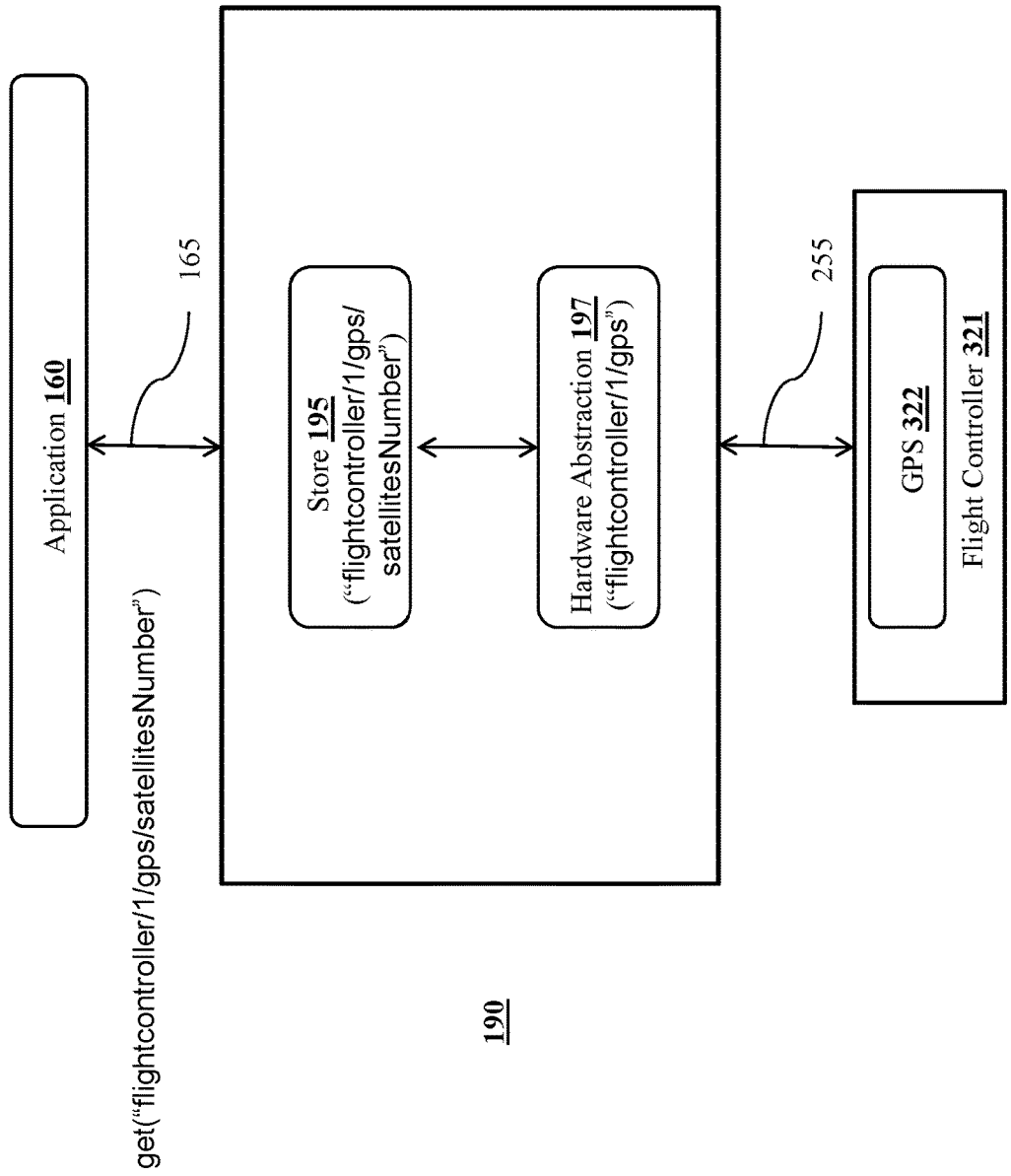
FIG. 11 is an exemplary diagram illustrating an embodiment of a method for retrieving movable object data of interest.

Turning now to FIG. 11, an exemplary process for requesting movable object data 311 is shown in accordance with the examples provided above. Here, the application 160 is to request a "satellites number" attribute of a GPS 322 device of a flight controller 321 of a UAV 320 (not shown). A request for the movable object data 311 can be sent to the movable object manager 180 (shown in FIG. 3) using an interface 170 (shown in FIG. 3). The request can be sent using an application call process 165 and an appropriate movable object data key 192. For example, a get ("flightcontroller/1/gps/satellitesNumber") method can be invoked by the application 160.

Upon invocation of the request, whether the movable object data 311 is available and/or updated in the cache 190 (for example, within a store 195 of the cache 190) can be determined. Where the movable object data 311 is available and/or updated, the movable object can advantageously be provided back to the application 160 from the cache 190 without querying the movable object 300, thereby reducing the number of protocol call processes 255 sent over potentially limited bandwidth. Where the movable object data 311 is unavailable and/or not updated, the movable object can be retrieved from the movable object 300 using the hardware abstraction 197 corresponding to the flight controller 321 of interest.

Figure 12:
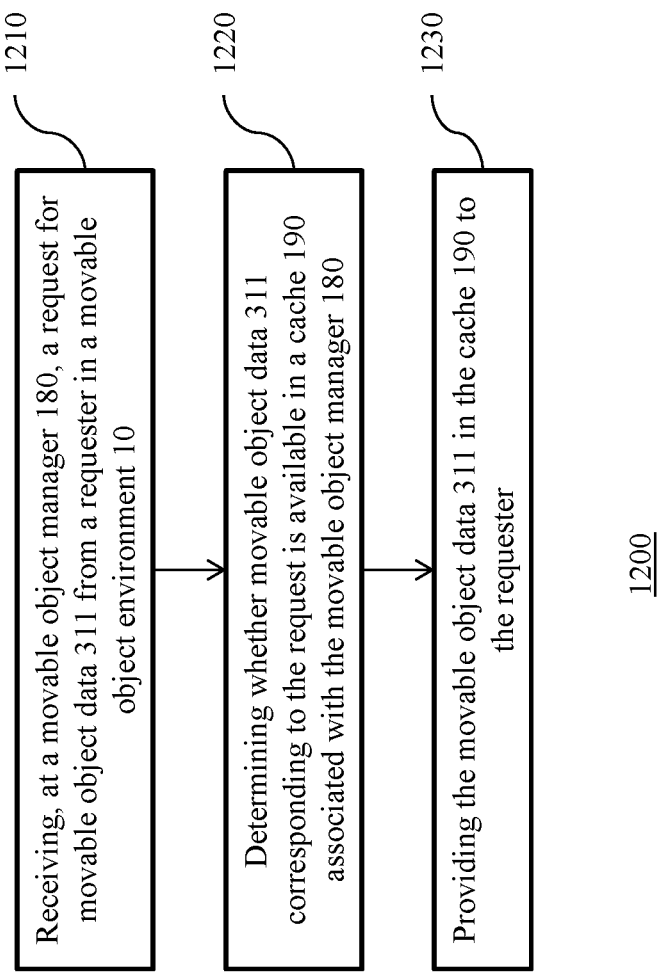
FIG. 12 is another exemplary top-level flow chart illustrating an embodiment of a method for managing communication with the movable object of FIG. 1.

Turning now to FIG. 12, an exemplary top-level block diagram for a method 1200 for managing communication with a movable object 300 is shown. At 1210, a request for movable object data 311 is received at a movable object manager 180 from a requester in a movable object environment 10. The requester can be, for example, an application 160 (shown in FIG. 3) or any other process running in the movable object environment 10. As described above with respect to FIG. 11, the request can be made as an application call process 165 using an appropriate movable object data key 192.

At 1220, whether movable object data 311 corresponding to the request is available in a cache 190 associated with the movable object manager 180 can be determined. For example, a store 195 of the cache 190 can be evaluated for whether movable object data 311 corresponding to the movable object data key 192 exists. In some embodiments, whether movable object data 311 is updated in the cache 190 can be determined.

Whether the movable object data 311 is updated can be determined according to a set of predetermined rules. In some embodiments, whether the movable object data 311 is updated can be determined according to a data type of the movable object data 311. For example, certain types of movable object data 311 are expected to remain fixed for the duration of use of the movable object 300 (for example, movable object data 311 reflecting mechanical configurations of the movable object 300, such as the number of batteries, is fixed in the duration of a mission of the movable object). In another example, some types of movable object data 311 can be regularly transmitted (or "pushed") from the movable object 300 to the movable object manager 180, and stored in the cache 190. Some types of "push" data can be assumed to be updated, without need for further determination.

Alternatively, and/or additionally, whether the movable object data 311 is updated can be determined according to a time stamp t of the movable object data 311. The time stamp t can be a time at which the movable object data 311 was transmitted by the movable object 300, and/or a time at which the movable object data 311 was received by the movable object manager 180. The time stamp t of the movable object data 311 can be stored in the cache 190, as desired. In some embodiments, the time stamp t of the movable object data 311 that is stored in the cache 190 can be compared with the current time to of the request to find a lapsed time Δt since the movable object data 311 was last updated. The lapsed time Δt can be compared to a predetermined threshold T to determine whether the movable object data 311 is updated or not. The predetermined threshold T can be specific to the type of movable object data 311. For example, certain types of movable object data 311 (for example, the number of satellites of a GPS 322) need not be regularly updated, and the predetermined threshold T can be set to a large value accordingly. In some embodiments, other types of movable object data 311 (for example, the charge status of a battery 327) are regularly updated, and the predetermined threshold T can be set to a smaller value accordingly.

Alternatively, and/or additionally, whether the movable object data 311 is updated can be determined according to a prior value of the movable object data 311. For example, a position of the movable object 300 can be determined to be updated where the movable object is positioned at a home base, or along an expected trajectory. If the position of the movable object 300 is unexpected (for example, off trajectory or in a restricted area), the position can be determined to be not updated.

At 1230, the movable object data 311 in the cache 190 can be provided to the requester. In some embodiments, where the movable object data 311 in the cache 190 is updated, the movable object data 311 can be directly provided to the requester without querying the movable object 300, advantageously saving time and bandwidth.

Figure 13:
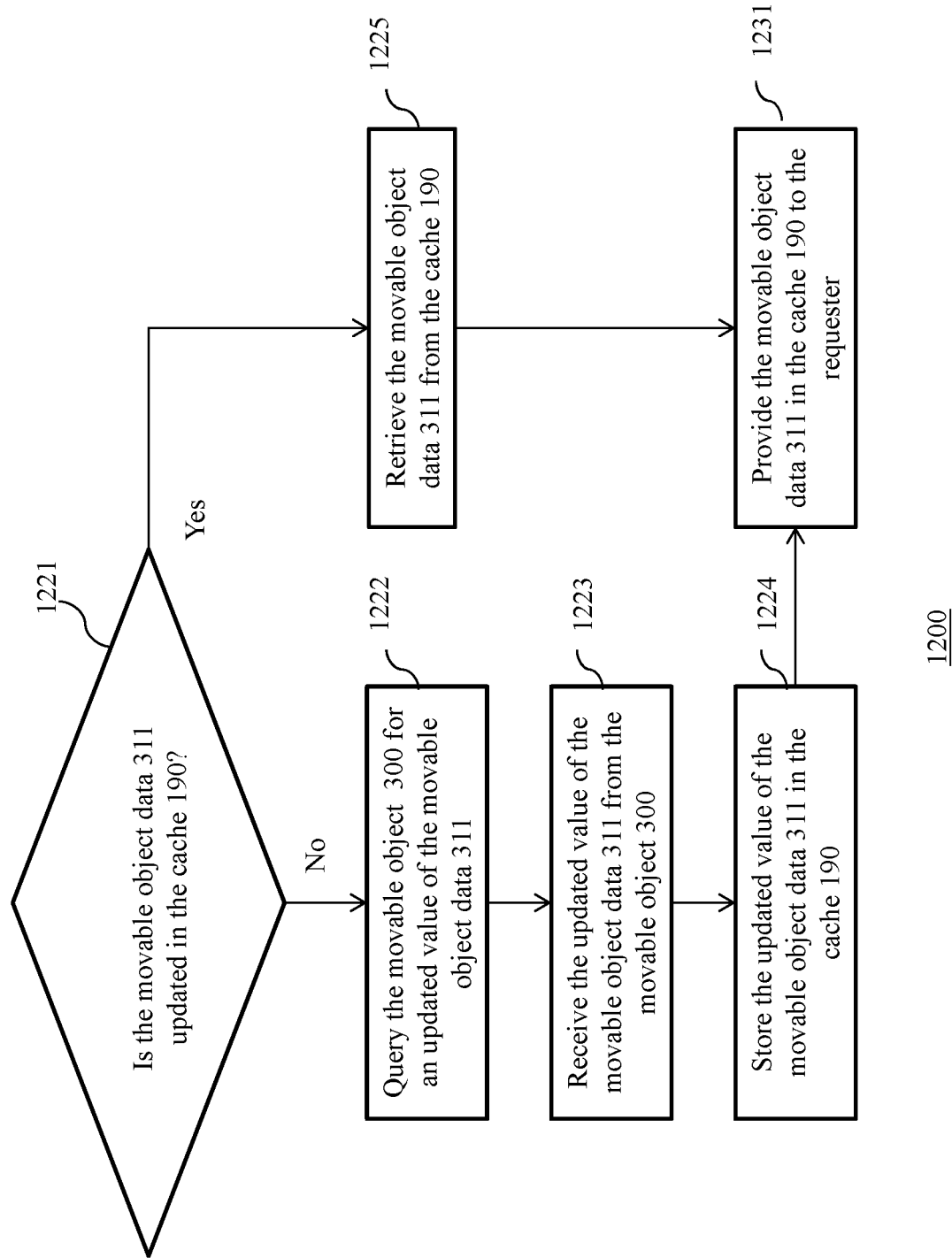
FIG. 13 is exemplary flow chart illustrating further details of the method of FIG. 12 for managing communication with the movable object of FIG. 1.

Turning now to FIG. 13, further details of various embodiments of the method 1200 are shown. At 1221, whether the movable object data 311 is updated in the cache 190 can be determined, as described above with reference to FIG. 12. If the movable object data 311 is not updated, then the movable object 300 is queried for an update value at 1222. At 1223, the updated value of the movable object data 311 is subsequently received from the movable object 300. At 1224, the updated value the movable object data 311 is stored in the cache 190. Alternatively, if the movable object data 311 is updated, then the movable object data 311 is retrieved from the cache 190 at 1225. Finally, at 1231, the movable object data 311 in the cache 190 is provided to the requester of the movable object data 311.

Figure 14:
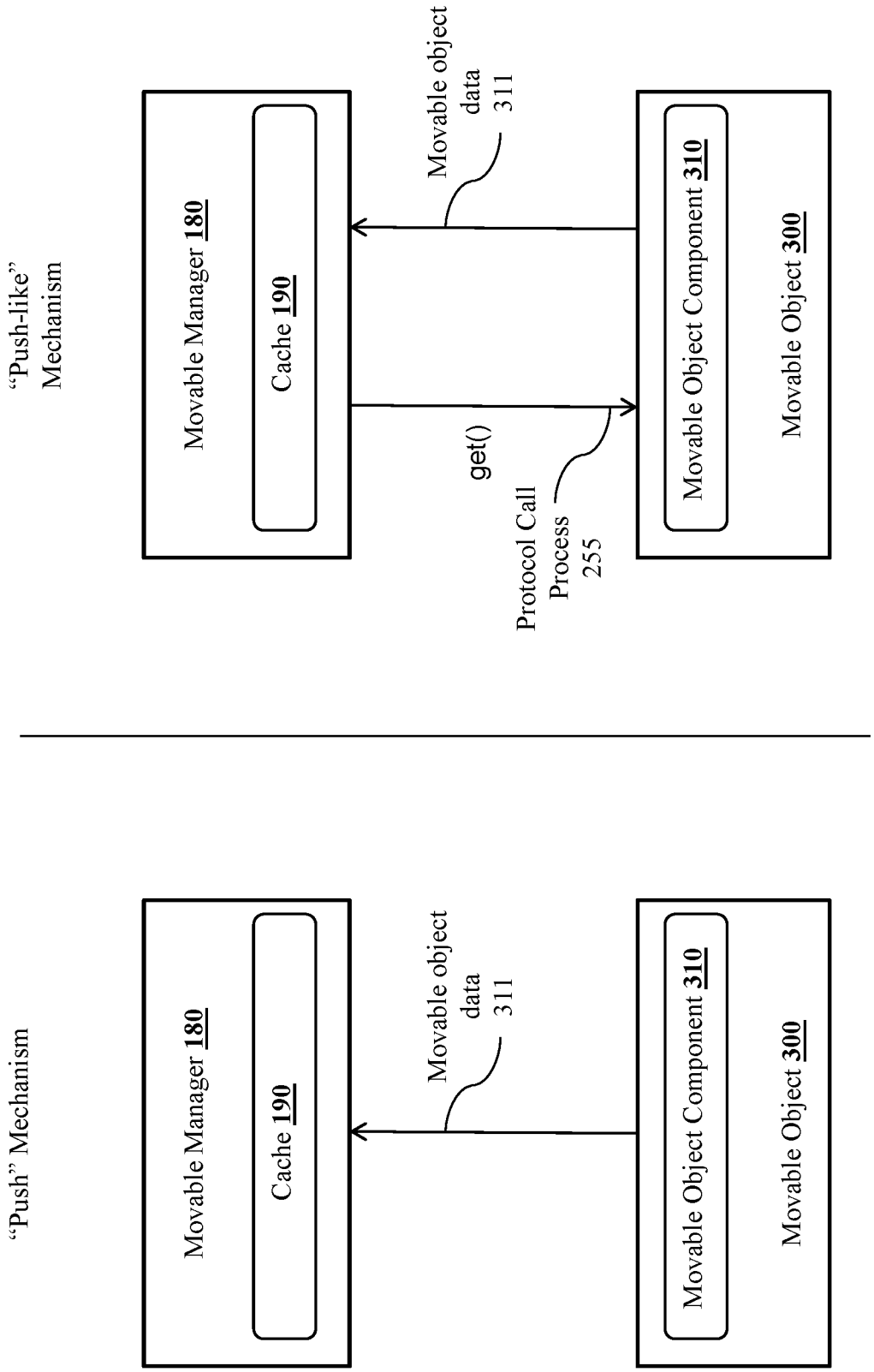
FIG. 14 is an exemplary diagram illustrating embodiments of a method for receiving movable object data from a movable object using "push" and "push-like" mechanisms.

Turning now to FIG. 14, exemplary diagrams are shown illustrating various embodiments for receiving movable object data 311 from a movable object 300. On the left panel of FIG. 14, a "push" mechanism is shown whereby movable object data 311 is automatically transmitted by the movable object 300 to the movable object manager 180. Certain types of data, as desired, can be designated "push" data and automatically transmitted to the movable object manager 180. In some embodiments, the movable object data 311 can be periodically transmitted from the movable object 300, received by the movable object manager 180, and stored in a cache 190. The frequency of transmission of such "push" data can vary, as desired. In contrast, on the right panel of FIG. 14, a "push-like" mechanism is shown that can be used when no "push" data is available. In such cases, the movable object manager 180 can send protocol call processes 255, such as get( ) methods in a movable object interface 170, to retrieve the movable object data 311 from the movable object 300. In some embodiments, the movable object data 311 can be periodically retrieved using automatic get( ) methods, and stored in the cache 190. In some embodiments, both the "push" and "push-like" mechanisms of retrieving the movable object data 311 can be used for different types of movable object data 311 for maximum flexibility and efficiency.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A system for managing communication with a movable object, comprising:
   one or more processors configured to:
      receive a request for movable object data from a requester in a movable object environment, the request including a movable object data key that includes data fields configured to identify a movable object component that corresponds to the movable object data;
      determine whether movable object data corresponding to the request is available in a cache associated with a movable object manager by determining whether the movable object data corresponding to the movable object data key exists in the cache; and
      in response to determining that the movable object data is available in the cache, provide the movable object data in the cache to the requester.

2. The system of claim 1, wherein the one or more processors are further configured to:
   query the movable object for the movable object data in response to an updated value of the movable object data being not available in the cache;

receive the updated value of the movable object data from the movable object; and store the updated value of the movable object data in the cache.

3. The system of claim 2, wherein the one or more processors are further configured to retrieve the movable object data from the cache in response to the updated value of the movable object data being available in the cache.

4. The system of claim 1, wherein the one or more processors are further configured to receive the request from the requester through a movable object application programming interface that is part of a movable object software development kit (SDK).

5. The system of claim 1, wherein the movable object component is identified through a hardware abstraction having a key router for storing the movable object data key.

6. The system of claim 1, wherein the movable object component is identified through a hardware abstraction having one or more accessors for accessing the movable object data.

7. The system of claim 1, wherein the one or more processors are further configured to receive the request using a listener for the movable object data in the movable object environment.

8. The system of claim 1, wherein the movable object is an unmanned aerial vehicle (UAV), and the movable object data is at least one of flight controller data, camera data, gimbal data, or battery data of the UAV.

9. A system for managing communication with a movable object, comprising:
one or more processors configured to:
register a listener for listening to movable object data in a movable object environment;
store the movable object data, which is received from the movable object using a movable object data key, in a cache associated with a movable object manager based on the movable object data key, the movable object data key including data fields configured to identify a movable object component that corresponds to the movable object data; and
provide the movable object data to an application corresponding to the listener in response to determining that the movable object data uses the movable object data key.

10. The system of claim 9, wherein the one or more processors are further configured to register the listener through a movable object application programming interface (API) that is part of a movable object software development kit (SDK).

11. The system of claim 9, wherein the one or more processors are further configured to store the movable object data by:
querying the movable object for the movable object data upon determining that the movable object data is not updated in the cache; and
receiving an updated value of the movable object data from the movable object.

12. The system of claim 9, wherein the one or more processors are further configured to register the listener with the movable object component corresponding to the movable object data.

13. The system of claim 12, wherein the one or more processors are further configured to register the listener using the movable object data key.

14. The system of claim 12, wherein the one or more processors are further configured to register the listener using the movable object data key identifying an attribute of the movable object component.

15. The system of claim 14, wherein the one or more processors are further configured to store the movable object data received from the listener via a request for the movable object data using the movable object data key.

16. The system of claim 9, wherein the one or more processors are further configured to provide the movable object data to an application listening to the movable object data.

17. The system of claim 16, wherein the one or more processors are further configured to provide the movable object data by:
detecting a change in the movable object data using the listener; and
notifying the application of the change in the movable object data.

18. The system of claim 17, wherein the one or more processors are further configured to detect the change by:
storing a prior value of the movable object data in the cache; and
comparing an updated value of the movable object data with the prior value to detect the change.

19. The system of claim 9, wherein the movable object is an unmanned aerial vehicle (UAV), and the movable object data is at least one of flight controller data, camera data, gimbal data, or battery data of the UAV.

* * * * *